(12) United States Patent
Lyon (10) Patent No.: US 7,479,787 B2
(45) Date of Patent: Jan. 20, 2009

(54) CURRENT REGULATOR FOR LOOP POWERED TIME OF FLIGHT AND LEVEL MEASUREMENT SYSTEMS

(75) Inventor: George Quinton Lyon, Peterborough (CA)

(73) Assignee: Siemens Milltronics Process Instruments, Inc., Peterborough, Ontario (CA)

( * ) Notice: Subject to any disclaimer, the term of this patent is extended or adjusted under 35 U.S.C. 154(b) by 896 days.

(21) Appl. No.: 10/931,897

(22) Filed: Sep. 1, 2004

(65) Prior Publication Data

US 2008/0079419 A1   Apr. 3, 2008

(51) Int. Cl.
 *G01R 27/04* (2006.01)
(52) U.S. Cl. .............. 324/644; 342/124; 73/290 R
(58) Field of Classification Search .............. 324/76.51, 324/643, 644; 323/277, 312; 342/120, 124; 361/1, 5, 20; 73/290 R
See application file for complete search history.

(56) References Cited

U.S. PATENT DOCUMENTS

| 3,691,426 | A | * | 9/1972 | Mankovitz .................. 361/60 |
| 4,489,601 | A | * | 12/1984 | Rao et al. ................. 73/290 R |
| 5,343,141 | A | * | 8/1994 | Metro et al. ................. 323/288 |
| 5,365,178 | A | * | 11/1994 | Van Der Pol ................. 324/644 |
| 5,440,310 | A | * | 8/1995 | Schreiner ..................... 342/124 |
| 5,497,073 | A | * | 3/1996 | Bohme et al. ............... 323/312 |
| 5,666,061 | A | * | 9/1997 | Assenheim ................. 324/636 |
| 6,293,142 | B1 | * | 9/2001 | Pchelnikov et al. ....... 73/290 R |
| 6,611,135 | B1 | * | 8/2003 | Schroeder ................ 324/76.51 |
| 6,717,416 | B2 | | 4/2004 | Koernle et al. |
| 2005/0035901 | A1 | * | 2/2005 | Lyon .......................... 342/124 |
| 2006/0001567 | A1 | * | 1/2006 | Nilsson ...................... 342/124 |

\* cited by examiner

*Primary Examiner*—Ha Tran T Nguyen
*Assistant Examiner*—Richard Isla Rodas
(74) *Attorney, Agent, or Firm*—Workman Nydegger (57) ABSTRACT

A protection circuit for a current loop powered level measurement or time of flight ranging apparatus. The protection circuit includes one or more Zener diodes, a leakage current detector circuit and a compensating current circuit. The leakage current detector circuit detects the leakage currents flowing from the Zener diodes and generates an output for the compensating current circuit. The compensating current circuit generates a compensating current so that the sum of the leakage currents and the compensating current remains a constant and the loop current is not affected by variations in the leakage currents for example as a result of variations in the voltage in the current loop or temperature of the device.

19 Claims, 5 Drawing Sheets

CURRENT REGULATOR FOR LOOP POWERED TIME OF FLIGHT AND LEVEL MEASUREMENT SYSTEMS

FIELD OF THE INVENTION

The present invention relates to time of flight ranging systems and level measurement systems, and more particularly to a constant current regulator for Zener diode based protection circuit for loop powered level measurement systems.

BACKGROUND OF THE INVENTION

Loop powered level measurement systems operate on a 4-20 mA current loop, hence the name loop powered. The circuitry for the level measurement system, i.e. the load, is typically designed to operate at less than 4 mA. The current loop provides a terminal voltage in the range 12-30V, but is nominally 24V.

To take a measurement, power is applied to the transducer and the reflected pulses are detected and the distance to the reflective surface is calculated or measured. If more than 4 mA is needed to make a measurement, then energy taken from the current loop is stored until there is enough to make the measurement. In addition, to make rapid measurements, more current from the loop is also needed. As the current in the loop increases, the speed of measurement also increases. Since the power available from the current loop is less than the power required to continuously operate the level measurement device, the level measurement device is operated intermittently. In a typical level measurement system, measurements are taken once every second up to once every five seconds.

In a typical level measurement application, the measurement instrument is mounted inside the storage tank or vessel, and a remote receiver, for example an industrial controller or plant control computer, is coupled to the other end of the current loop. If the level measurement system is being used in explosive or hazardous environments, for example in a chemical plant or refinery, protection circuitry is provided to avoid a potential explosion, for example, if there is sparking in the circuitry in the measurement instrument. The protection circuitry also acts to prevent damage from high voltage transients or when two different circuits show different ground potentials.

One form of known protection circuitry utilizes Zener diodes. The Zener-based protection circuitry restricts the maximum voltage that could be found in the circuit. A resistor is typically added to further reduce potential energy build-up which may result in sparking. However, Zener diodes exhibit a leakage current, and the leakage current will vary depending on the applied voltage. One approach is to include a regulator to control the voltage applied across the Zener diodes to minimize leakage currents. While this approach has proven adequate to reduce and even minimize the leakage currents, component variations in the circuitry and temperature changes still result in variations in the leakage currents. Since a loop powered level measurement device requires precisely controlled currents, it will be appreciated such variations will affect the precision of the device.

Accordingly, there remains a need for improved method and apparatus for stabilizing leakage current variations so that the loop current is accurate over temperature and input voltage.

BRIEF SUMMARY OF THE INVENTION

The present invention provides a method and apparatus for regulating current in a Zener diode based protection circuit suitable for a level measurement or time of flight ranging system.

In a first aspect, the present invention provides a level measurement system, said level measurement system being powered by a two wire loop, said level measurement system comprising: (a) a transducer for emitting energy pulses and detecting reflected energy pulses; (b) a controller having a component for controlling said transducer, and a component for determining a level measurement based on the time of flight of said reflected energy pulse; (c) a power supply having an input port for receiving power from the loop for producing an output voltage; (d) a protection circuit, said protection circuit being coupled to the two wire loop and including one or more protection diodes and a current regulator circuit, said current regulator circuit generating a constant current output for the two wire loop, and including a detector circuit coupled to said one or more protection diodes for detecting a leakage signal corresponding to leakage current flowing in said one or more protection diodes, and said current regulator including a compensator circuit, said compensator circuit having an input for receiving said leakage signal and a circuit for generating a variable current signal based on said leakage signal, said variable current having a magnitude for maintaining said constant current output.

In another aspect, the present invention provides a level measurement apparatus, the level measurement apparatus is powered by a current loop, the level measurement apparatus comprises: (a) a transducer for emitting energy pulses and detecting reflected energy pulses; (b) a controller having a component for controlling the transducer, and a component for determining a level measurement based on the time of flight of said reflected energy pulse; (c)a power supply for receiving power from the two wire loop and generating circuit power for the level measurement system; (d) a protection circuit coupled to the two wire loop at an input terminal and a return terminal, the protection circuit includes one or more Zener diodes, a leakage current detector circuit and a compensating current circuit, the leakage current detector circuit is coupled to the Zener diodes and includes a component for generating a sensed voltage in response to leakage currents from the Zener diodes, and the compensating current circuit having an input for receiving the sensed voltage and another input for receiving a reference voltage, the compensating circuit includes a component for generating a compensating current based on the sensed voltage and the reference voltage, and the compensating current and the leakage currents form a constant current for the two wire loop.

In yet another aspect, the present invention provides a level measurement apparatus, the level measurement apparatus being powered by a current loop, the level measurement apparatus comprises: means for emitting energy pulses and detecting reflected energy pulses; means for controlling said transducer, and means for determining a level measurement based on the time of flight of said reflected energy pulse; means for protecting coupled to the two wire loop at an input terminal and a return terminal, said means for protecting including one or more Zener diodes, means for detecting leakage current and means for generating a compensating current, said means for detecting leakage current being coupled to said Zener diodes and including means for generating a sensed voltage in response to leakage currents from said Zener diodes, and said means for generating a compensating current having an input for receiving said sensed voltage and another input for receiving a reference voltage, said means for generating a compensating current including a component for generating a compensating current based on said sensed voltage and said reference voltage, and said compensating current and said leakage currents forming a constant current for the two wire loop.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings, which show, by way of example, embodiments of the present invention and in which.

In the drawings, like references indicate like components or elements.

DETAILED DESCRIPTION OF THE EMBODIMENTS

Figure 1:
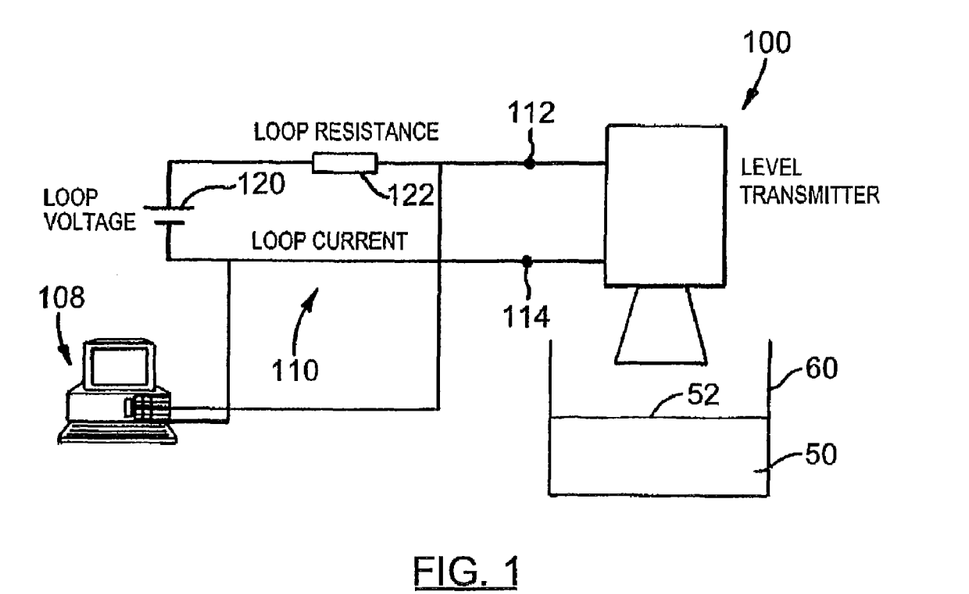
FIG. 1 shows in diagrammatic form a loop powered level measurement system with a protection circuit and constant current regulator according to the present invention.

Reference is first made to FIG. 1 which shows a loop powered level measurement system with a protection circuit with a constant current regulator according to the present invention. The loop powered level measurement system, indicated generally by reference 100, interfaces to a power/communication loop 110, for example a 4-20 mA current loop. The loop powered level measurement system 100 is coupled to the current loop 110 at terminals 112 and 114. A remote receiver, for example a plant control computer, indicated by reference 108 is coupled at the other end of the current loop 110. For a typical 4-20 mA current loop configuration, the loop 110 provides a current in the range 4 to 20 mA and a loop voltage in the range 18 to 30 Volts. The loop voltage is nominally at 24 Volts and represented as a voltage source with reference 120. The resistance of the loop is represented as a resistive element 122 and is typically in the range 0 to 550 Ohms. While the loop current is normally in the range 4 to 20 mA, the current may range from 3.6 to 21.6 mA to indicate alarm conditions.

Figure 2:
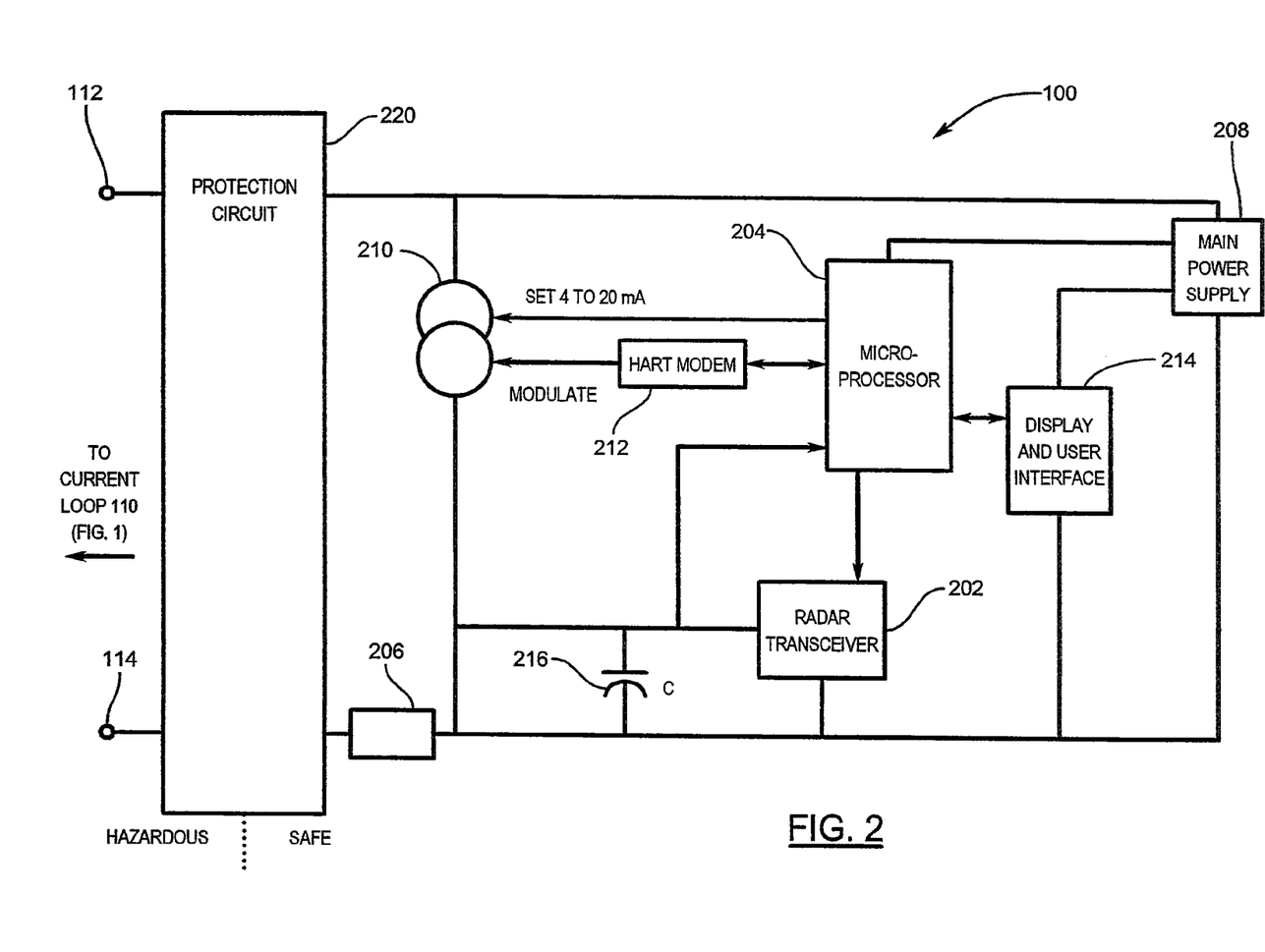
FIG. 2 shows in block diagram form the loop powered level measurement system according to the present invention.

Reference is next made to FIG. 2 which shows in more detail the level measurement system and constant current regulator 100 according to the invention. The level measurement system 100 comprises a transducer module 202, a controller 204, a power supply 208, a current regulator 210, and a protection circuit with a constant current regulator 220. The level measurement system 100 may also include a communication module 212. The level measurement system 100 also includes a loop current sensing circuit indicated generally by reference 206. The loop current sensing circuit provides feedback to the current regulator 210 on the current flowing in the loop 110.

The power supply 208 comprises a switching power supply and is designed to consume less than the minimum loop current, nominally 4 mA.

The current regulator 210 is operated under firmware control by the controller 204 to draw additional current to achieve the desired current in the current loop 110. One terminal of the current regulator 210 is connected to terminal 112 of the current loop 10 and the input to the power supply 208. The current regulator 210 has a control terminal which is coupled to a control output port on the controller 204.

As shown in FIG. 2, the level measurement system 100 also includes a user interface module 214. The user interface module 214 comprises a display, for example, a LCD module, and a keypad or touch sensitive overlay on the LCD.

The transducer module 202 is coupled to a control port and input/output port on the controller 204. The transducer module 202 includes a transducer, a transmitter stage and a receiver stage (not shown). The transducer (not shown) may comprise radar-based technology, ultrasonic-based technology, TDR-based technology (time domain reflective), or other distance ranging technology. Under the control of a program stored in memory (e.g. firmware), the controller 204 generates a transmit pulse control signal for the transmit stage in the transducer module 202, and the transducer (not shown) emits a transmit burst of energy, for example, radar pulses directed at the surface of a material 50 (FIG. 1) contained in a storage vessel 60 (FIG. 1). The reflected or echo pulses, i.e. the propagated transmit pulses reflected by the surface 52 of the material 50 (FIG. 1), are coupled by the transducer, for example, a radar antenna or other distance ranging technology (not shown), in the transducer module 202 and converted into electrical signals by the receiver stage (not shown). The electrical signals are inputted by the controller 204 and sampled and digitized by an A/D converter (not shown) and a receive echo waveform or profile is generated. The controller 204 executes an algorithm which identifies and verifies the echo pulse(s) and calculates the range, i.e. the distance to the reflective surface 52, from the time it takes for the reflected energy pulse(s) to travel from the reflective surface 52 (FIG. 1) to the transducer (not shown) in the transducer module 202. From this calculation, the distance to the surface 52 of the material 50 and thereby the level of the material 50 in the vessel 60 is determined. The controller 204 may comprise a microprocessor or a microcontroller with on-chip resources, such as an A/D converter, ROM (EPROM), RAM. The microprocessor or microcontroller is suitably programmed to perform these operations as will be within the understanding of those skilled in the art.

Referring to FIG. 2, power for the operation of the level measurement system 100 is derived from the current loop 110. The power supply module 208 comprises a switching power supply which takes its power input from the current loop 110 and generates the appropriate voltage levels, e.g. supply rails, for the circuitry, i.e. the controller 204, the display and user interface module 214 and the other electronic modules in the level measurement system 100.

The controller module 204 also controls the transmission of data and control signals through the interface with the current loop 110. The controller 204 uses the current regulator 210 to adjust or modulate the loop current in the range 4 to 20 mA to transmit the calculated level of the material 50 to the remote receiver or plant computer 8 (FIG. 1) connected to the other end of the current loop 110 (FIG. 1). As shown in FIG. 2, the level measurement system 100 may include the communication module 212. The communication module 212 includes a digital communication modem, for example a HART modem, which provides another communication channel between the controller 204 and the remote computer 8 (FIG. 1) over the wires of the current loop 110.

In operation, the user interface module 214 comprising the display module and the keypad, and the digital communication module 212 are run continuously. The display, user interface and communication operations may be thought of as primary functions which run continuously. The transducer module 202 is operated intermittently to transmit energy pulses and detect reflected energy pulses from the surface of the material 50 contained in the vessel 60.

As also shown in FIG. 2, the circuitry for the level measurement system 100 may include a power storage capacitor 216. The storage capacitor 216 is charged with excess current from the current loop 110 to provide additional power for operating the transducer 202 and/or other circuitry. As shown, the controller 204 has an input port coupled to the storage capacitor 216. The controller 204 senses the voltage on the storage capacitor 216. When the voltage level on the capacitor 216 is sufficient to power the transducer module 202, the controller 204 activates the transducer 202 to perform a level measurement for the vessel 60 (FIG. 1). The controller 204 then deactivates the transducer module 202 and the capacitor 216 is allowed to recharge. The level measurement calculated by the controller 204 is transmitted to the remote computer 8 (FIG. 1) as a communication task for the primary functions. It is not necessary to turn off the controller 204 between measurements, and the controller 204 continues to execute the refresh operation and keypad scan functions for the user interface module 214, and the communication function.

Referring to FIG. 2, the level measurement system 200 includes the protection circuit indicated generally by reference 220. The protection circuit 220 prevents the build-up of high voltages and the potential for sparking and defines a barrier between the circuitry the in the system 200, i.e. a SAFE zone, and the HAZARDOUS zone or operating environment where sparking could lead to an explosion. As will be described in more detail below, the protection circuit 220 comprises Zener diodes and resistive element(s) for limiting high voltages and, in accordance with one aspect of the invention, includes a regulator circuit for regulating leakage currents in the Zener diodes to minimize current variation effects on the current flowing in the loop 110.

Figure 3:
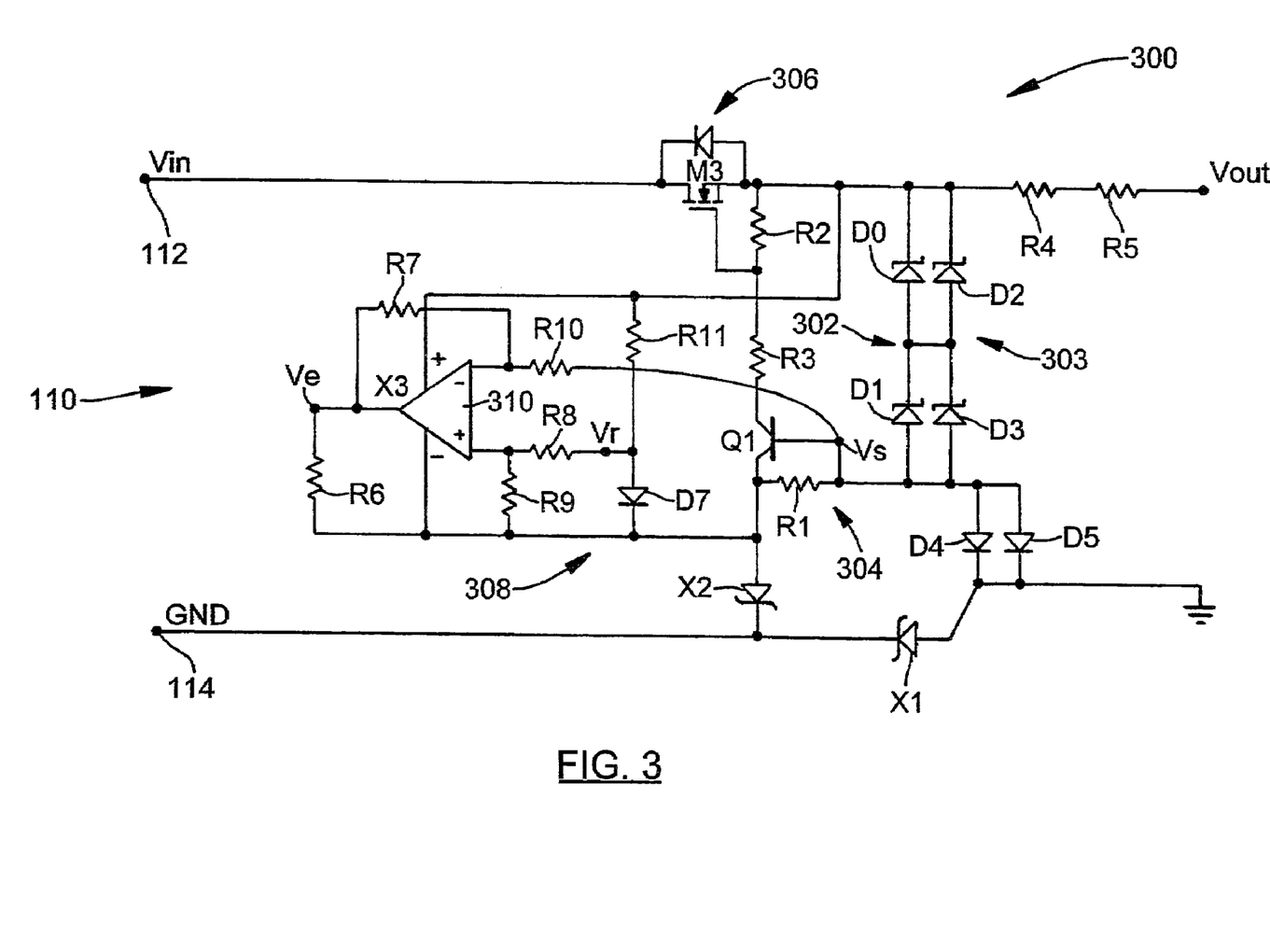
FIG. 3 shows in schematic form one implementation for the constant current regulator for the protection circuit for the level measurement system in FIG. 1.

Reference is next made to FIG. 3, which shows in schematic form a circuit implementation for one embodiment of a Zener diode based regulator circuit indicated generally by reference 300. As shown in FIG. 3, the Zener diode based regulator circuit 300 comprises a first pair 302 of diodes D0 and D1, a current sensor 304, an input control 306, and a compensating current generator 308. The input control 306 comprises a MOSFET type transistor, and the current sensor 304 comprises a bipolar junction transistor or BJT. The MOSFET 306 is implemented using a depletion mode device. The source of the MOSFET transistor 306 is coupled to the current loop at terminal 112 or $V_{in}$. The drain of the MOSFET 306 is coupled to the cathode of diode D0 and to the gate through a resistor R2. The gate is also coupled to the collector of the BJT 304 through a resistor R3. The base of the BJT 304 is coupled through a resistor R1 to the anode of the diode D1. The Zener diodes D0 and D1 are stacked to divide the power dissipation between the diodes. As shown in FIG. 3, the circuit 300 may also include Schottky diodes X1 and X2.

Diode X1 carries the loop current, i.e. between about 3.6 mA and 23 mA, and exhibits a larger voltage drop than the other Schottky diode X2, which carries a small control current. The diode X2 is coupled between the emitter of the BJT 304 and the return terminal 114 (FIG. 1 or FIG. 2). As also shown in FIG. 3, the Zener protection circuit 300 may also include one or more resistors R4, R5 to further reduce voltages in the circuit and thereby reduce the energy available for sparking/ignition.

The Zener diodes D0, D1 and resistors R4, R5 function to protect the level transmitter 100 (FIG. 1 and FIG. 2) by limiting the maximum voltage that could be found in the 'safe' side. When the maximum applied voltage exceeds a predetermined value, the diodes D0 and D1 reverse breakdown voltages are exceeded and the diodes D0 and D1 conduct to shunt the current and reduce the input voltage $V_{in}$ at terminal 112.

As shown in FIG. 3, the circuit 300 includes a second pair 303 of diodes D2 and D3 which act as a parallel pair should the first pair 302 fail. The diodes D2 and D3 are stacked in series to divide the power dissipation between them. Diodes D4 and D5 act as shunts and limit the voltage across resistor R1 during a fault condition, i.e. Zener diodes D0 and D1, D2 and D3 are on. The resistors R4 and R5 are provided as a series connected pair so that a current limiting resistor is present in the circuit should one of the resistors R4, R5 fail in a short circuit.

It will be appreciated that leakage currents in the Zener diodes D0, D1, D2, D3 vary depending on the applied voltage $V_{in}$ and also on temperature effects. If the input voltage $V_{in}$ is less than the Zener voltage then no current flows through the Zener diodes D0 to D4, and then no control current flows through the current sensor BJT 304. As the input voltage $V_{in}$ increases, i.e. at terminal 112 (FIG. 1), and the Zener diodes D0-D4 start to conduct, the control current starts to flow through the BJT 304 and the constant current increases to a value given as $V_{be}/R1$, where $V_{be}$ is voltage between the base and the emitter of the BJT 304 when it is controlling the output voltage. The control current is also affected by temperature according to the temperature dependence of $V_{be}$ for the BJT 304. As will now be described, the compensating current generator 308 functions to minimize variations in the leakage currents.

As shown in FIG. 3, the compensating current generator or circuit 308 comprises an operational amplifier 310. The operational amplifier 310 is configured as a differencing amplifier with a gain of 1. (The gain may also be more than 1.) The gain of 1 is set by selecting resistors R7, R8, R9 and R10 having the same value. The operational amplifier 310 measures the difference in voltage between the sense resistor R1 and a reference voltage $V_r$. The operational or differencing amplifier 310 is powered through the loop 110, with the positive supply input coupled to the source of the MOSFET 306 and the negative supply input coupled to the return 114 through the Schottky diode X2.

Resistor R6 is connected to the output of the differencing amplifier 310. The value of resistor R6 is the same as the value of resistor R1. The inverting input of the differencing amplifier 310 is coupled to the base of the BJT 304 and receives a sensed input voltage $V_s$. The sensed voltage $V_s$ is derived from the leakage currents flowing in the Zener diodes D0 to D3. The non-inverting input of the differencing amplifier 310 receives the reference voltage $V_r$. The reference voltage $V_r$ is derived from a diode D7. The diode D7 is implemented using a diode connected transistor where the transistor has the same or similar response characteristics to the BJT 304, e.g. $V_{be}$ is 0.6 Volts. As shown in FIG. 3, the diode D7 is biased by resistor R11 which is coupled to the drain of the MOSFET 306.

In operation, when the input voltage V is high, i.e. applied at terminal 112, then the leakage current flowing in the Zener diodes D0, D1 and D2, D3 is sensed by the resistor R1 and provides the sensed voltage $V_s$. The transistor Q1 starts conducting and decreases the voltage at the gate of MOSFET 306. As a result of the voltage reduction on the gate, the MOSFET 306 restricts the maximum voltage across the diodes D0, D1 and D2, D3. The diode D7 is biased by the resistor R11 and the reference voltage $V_r$ and will operate at a substantially constant voltage which is close to the sensed voltage $V_s$ because the diode D7 carries a similar current, e.g. in the microampere range. For a small voltage difference at the inputs of the differential amplifier 310, there is a small output voltage $V_e$ (i.e. $V_e = V_r - V_s$) and the resultant current in the resistor R6 is also small. The net result is that the current flowing through the resistor R1 and the current flowing through the resistor R6 add up to a constant amount.

In operation when the input voltage $V_{in}$ is low, there will be no or negligible leakage currents in the Zener diodes and the sensed voltage $V_s$ is essentially zero and transistor Q1 is not conducting. As a result, the MOSFET 306 (i.e. a depletion mode device) is fully ON and with $V_s$ substantially zero, $V_e = V_r$, and $V_r$ appears across the resistor R6. The resultant current flowing in resistor R6 is essentially the same as the total current flowing when the input voltage $V_{in}$ is high as described above. In other words, the current flowing through the resistor R1 and the current flowing through the resistor R6 add up to a constant amount.

In operation when the input voltage $V_{in}$ approaches the Zener voltage, the Zener diodes D0, D1 and D2, D3 start to conduct and the Zener or reverse current flowing in the sensing resistor R1 provides the sensed voltage $V_s$. The operational amplifier 310 takes the difference between the voltage reference $V_r$ and the sensed voltage $V_s$ to produce the output voltage $V_e$ which has the effect of reducing the sensed voltage $V_s$ appearing at the inverting input of the operational amplifier 310. The net result is that the current flowing through the resistor R1 and the current flowing through the resistor R6 add up to a constant amount.

Having compensated for current variation arising from Zener current leakage variation with increasing input voltage, it is necessary to ensure that no other currents in the circuit can vary significantly with the input voltage $V_{in}$. The following steps may be taken:
(1) selecting resistors R2 and R3 with high values so that draw only a small current, which if variable does not have an appreciable effect;
(2) resistor R11 is selected to allow a current approximately equal to the control current to bias the diode D7, so that the diode voltage is close to $V_{be}$ of transistor Q1.
(3) utilizing the inherent nature of the operational amplifier 310 to draw a constant current when not driving a load.

As described above, in operation the Zener based regulator circuit 300 depicted in FIG. 3 determines if there are leakage currents ($I_s$) flowing in the Zener diodes D0-D3, and if there are leakage currents, the operational amplifier generates an output or compensation current ($I_c$) flowing in resistor R6 to compensate for the leakage current $I_s$ so that the total current ($I_s + I_c$) remains substantially constant. Similarly, if the leakage current $I_s$ decreases, then the compensation current $I_c$ is increased to maintain the constant total current amount.

This relationship may be also illustrated mathematically as follows:

Zener leakage current $I_z$ flows through resistor R1
Compensating current $I_c$ flows through resistor R6, and R1=R6=R, then $$V_s = I_z * R$$

$$V_c = I_c * R$$

For the differencing amplifier (indicated by reference 310), $$V_e = V_r - V_s$$

Substituting from above, $$I_c * R = V_r - I_z * R$$

Re-arranging the above, $$I_c + I_s = V_r / R \quad (1)$$

According to equation (1), the sum of the leakage currents $I_z$ and the compensation current $I_c$ is a constant amount given by $V_r/R$. The loop current will remain essentially constant as input voltage varies. By maintaining the current associated with leakages constant, outside variations are not introduced into the loop current. A similar effect may be achieved if the gain, i.e. $A_D$, of the differencing amplifier is not equal to one, and resistor R6 is set a value given by $R6 \times A_D$.

It will be appreciated that the Zener based regulator 300 of FIG. 3 may still be susceptible to some temperature effects arising from the voltage reference $V_r$. In particular, the base emitter voltage $V_{be}$ of the diode connected transistor D7 will vary with temperature according to the known Ebers Moll model for bipolar junction transistors.

Figure 4:
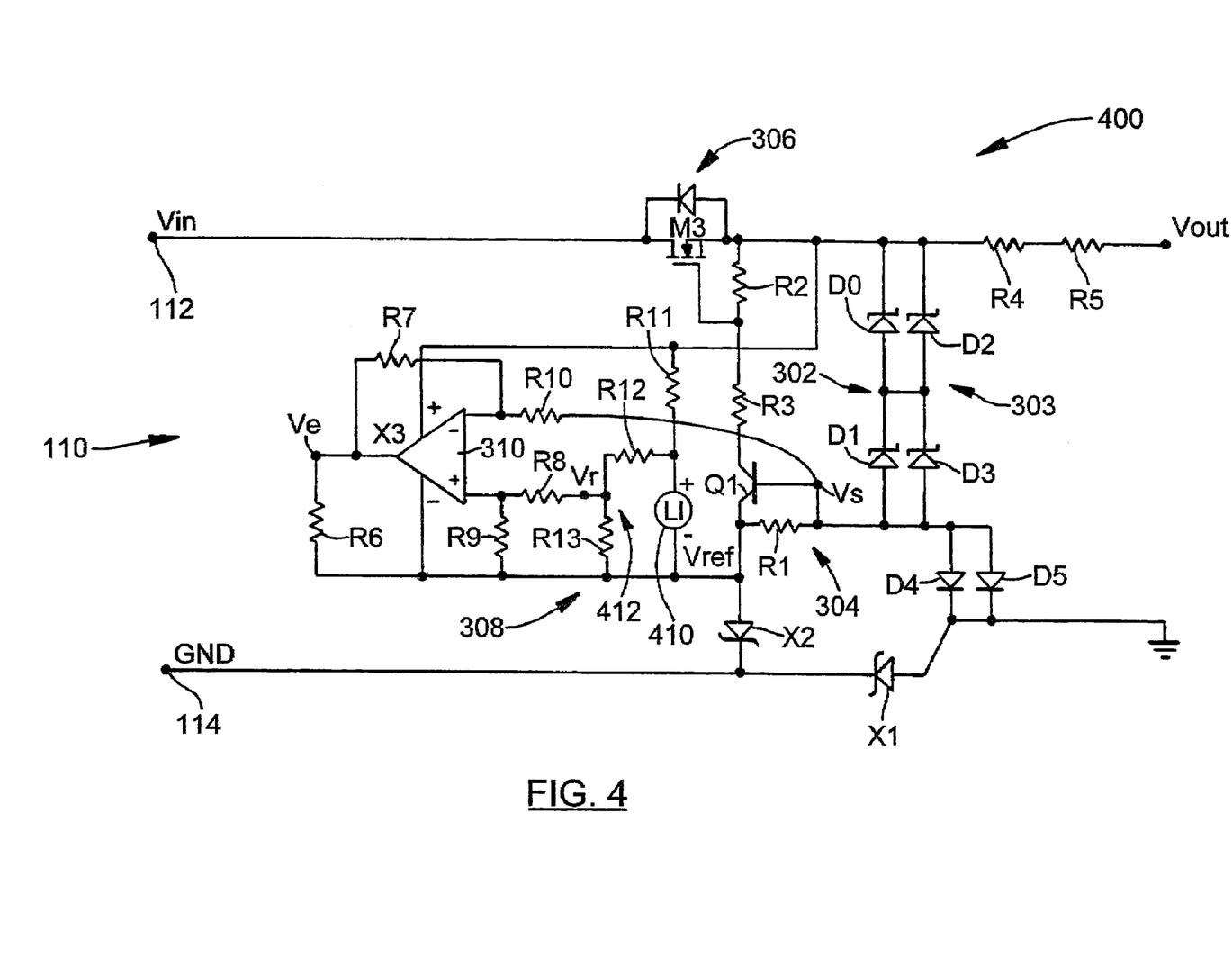
FIG. 4 shows in schematic form another embodiment of the constant current regulator for the protection circuit for the level measurement system in FIG. 1.

Reference is next made to FIG. 4 which shows in schematic form another implementation of a Zener based regulator 400 according to another aspect of the invention. Like references indicate like elements/components in FIGS. 3 and 4.

As shown in FIG. 4, the Zener based regulator circuit 400 includes a voltage reference source $V_{ref}$ indicated by reference 410. The voltage reference source $V_{ref}$ comprises an accurate, low power and stable voltage reference instead of the diode D7 of FIG. 3, which according to one embodiment is implemented as a diode connected bipolar junction transistor. As also shown in FIG. 4, a voltage divider 412 comprising resistors R12 and R13 is connected to the reference source $V_{ref}$ and the voltage reference $V_r$ is defined at the junction of the two resistors R12 and R13. The output voltage from the voltage reference source $V_{ref}$ is divided by the voltage divider 412 so that the voltage reference $V_r$ is slightly more than the maximum voltage value for the voltage $V_s$. As given by equation (1) above, the sum of the currents $I_c + I_s$ is constant as long as the output from the voltage reference source $V_{ref}$ is constant.

Figure 5:
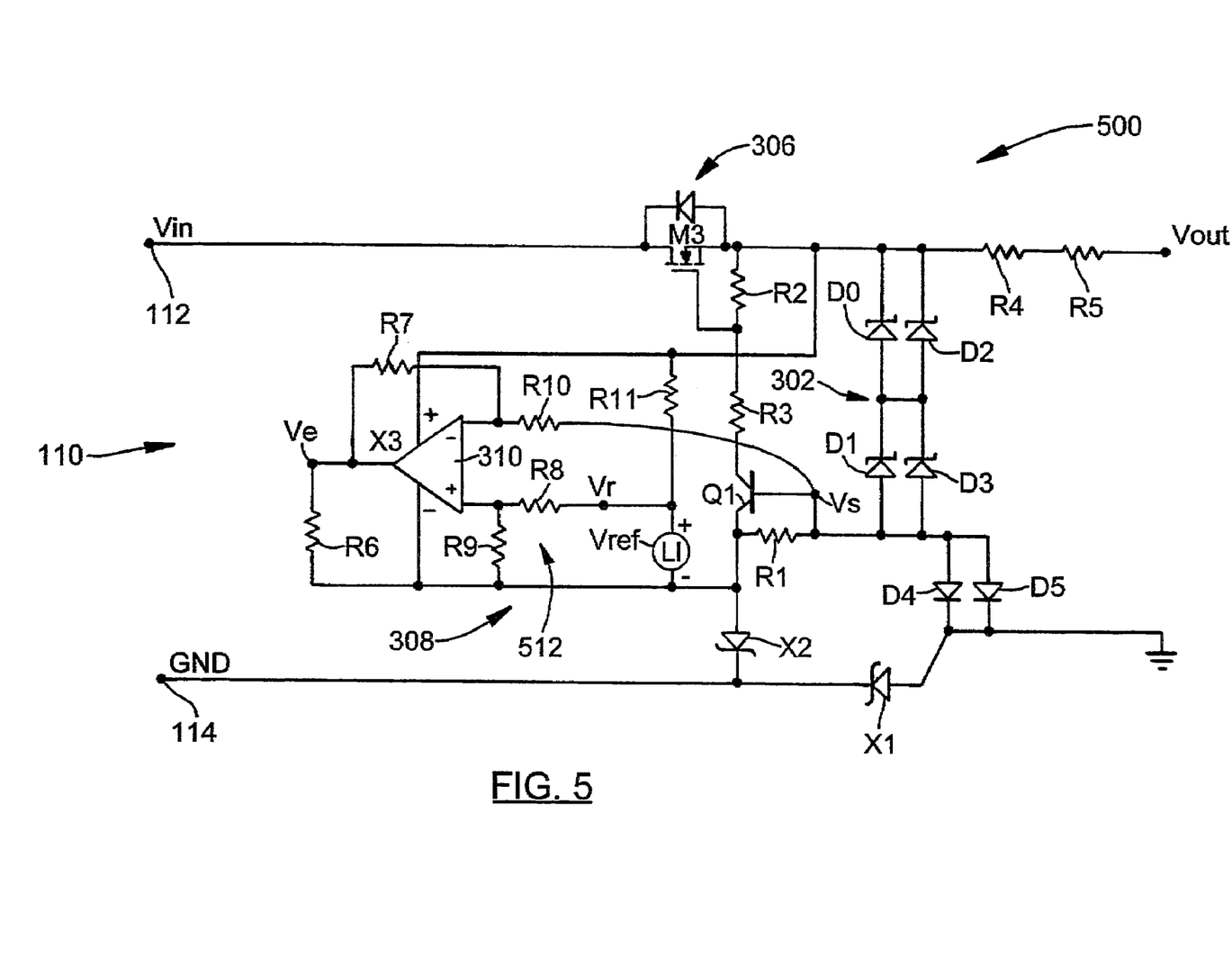
FIG. 5 shows in schematic form another embodiment of the constant current regulator for the protection circuit for the level measurement system in FIG. 1.

Reference is next made to FIG. 5 which shows in schematic form a Zener based regulator circuit 500 according to another aspect of invention. In the regulator circuit 500 of FIG. 5, the values of resistors R8 and R9 have been adjusted to include the voltage divider function provided by resistors R12 and R13 for the voltage divider 412 shown in FIG. 4. Like references indicate like elements/components in FIGS. 4 and 5.

The configuration of the Zener based regulator circuit 500 is illustrated as follows:

Assuming
0.7V as maximum value for $V_s$, and
$V_r$ is chosen to be 0.8V
then, the non-inverting input of the op amp (310) is at 0.4V,
For a voltage reference source, such as the REF1112 device (1 µA, 10 ppm/°C), the output voltage is 1.25V, and the resistor divider 412 is selected to divide the output voltage from 1.25V to 0.4V and R8 is 850 KOhms and R9 is 400 KOhms.

The voltage divider formed by resistors R8 and R9 is indicated by reference 512 in FIG. 5.

It is to be appreciated that the exact values of components, e.g. resistors, in the circuit implementations for the Zener based regulator 300, 400 or 500 may be adjusted without affecting the general features of the circuits. According to one aspect, the Zener based regulator includes an operational amplifier which subtracts a sensed signal (i.e. leakage current) from an offset signal, and the resistor R6 is scaled by the resistor ratio R7/R10 to maintain the total current substantially constant. Furthermore, by choosing the offset signal (i.e. voltage reference $V_r$ to be greater than the sensed voltage $V_r$), then the output of the operational amplifier 310 will remain positive and the operational amplifier can be powered from a single polarity supply.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A level measurement system, said level measurement system being powered by a two wire loop, said level measurement system comprising:
   (a) a transducer for emitting energy pulses and detecting reflected energy pulses;
   (b) a controller having a component for controlling said transducer, and a component for determining a level measurement based on the time of flight of said reflected energy pulse;
   (c) a power supply having an input port for receiving power from the loop, and a circuit for producing an output voltage;
   (d) a protection circuit, said protection circuit being coupled to the two wire loop and including one or more protection diodes and a current regulator circuit, said current regulator circuit generating a constant current output for the two wire loop, and including a detector circuit coupled to said one or more protection diodes for detecting a leakage signal corresponding to leakage current flowing in said one or more protection diodes, and said current regulator including a compensator circuit, said compensator circuit having an input for receiving said signal and a circuit for generating a variable current signal based on said signal, said variable current having a magnitude for maintaining said constant current output.

2. The level measurement system as claimed in claim 1, wherein said compensator circuit includes a reference signal generator for providing a reference signal, and said circuit generating a variable current signal based on a difference signal between said leakage signal and said reference signal.

3. The level measurement system as claimed in claim 2, wherein compensator circuit comprises an operational amplifier, said operational amplifier being powered by the two wire loop and including an inverting input for receiving said leakage signal and a non-inverting input for receiving said reference signal.

4. The level measurement system as claimed in claim 3, wherein said detector circuit comprises a bipolar junction transistor and a resistor coupled across the base and emitter terminals of said bipolar junction transistor and said leakage signal comprises a voltage drop across said resistor from said leakage current, and said reference signal generator comprises a diode connected bipolar junction transistor.

5. The level measurement system as claimed in claim 3, wherein said detector circuit comprises a bipolar junction transistor and a resistor coupled across the base and emitter terminals of said bipolar junction transistor and said leakage signal comprises a voltage across said resistor from said leakage current, and said reference signal generator comprises a temperature compensated voltage reference.

6. The level measurement system as claimed in claim 5, wherein said detector circuit comprises a voltage control device coupled to the input terminal of the two wire loop, said voltage control device having a control input coupled to said detector circuit for receiving a control signal generated by said detector circuit, said control signal being derived from said leakage signal, said voltage control device being responsive to said control signal for reducing voltage in the protection circuit.

7. The level measurement system as claimed in claim 6, wherein said voltage control device comprises a depletion mode field effect transistor having a gate, said gate forming said input and being coupled to the collector of said bipolar junction transistor.

8. A level measurement apparatus, said level measurement apparatus being powered by a current loop, said level measurement apparatus comprising:
   (a) a transducer for emitting energy pulses and detecting reflected energy pulses:
   (b) a controller having a component for controlling said transducer, and a component for determining a level measurement based on the time of flight of said reflected energy pulse;
   (c) a power supply coupled to the current loop for generating circuit power in the level measurement apparatus;
   (d) a protection circuit coupled to the two wire loop at an input terminal and a return terminal, said protection circuit including one or more Zener diodes, a leakage current detector circuit and a compensating current circuit, said leakage current detector circuit being coupled to said Zener diodes and including a component for generating a sensed voltage in response to leakage currents from said Zener diodes, and said compensating current circuit having an input for receiving said sensed voltage and another input for receiving a reference voltage, said compensating circuit including a component for generating a compensating current based on said sensed voltage and said reference voltage, and said compensating current and said leakage currents generating a constant current for the two wire loop.

9. The level measurement apparatus as claimed in claim 8, wherein said component for generating a compensating current comprises an operational amplifier having an inverting input for receiving said sensed voltage and a non-inverting input for receiving said reference voltage and a resistor for said compensating current.

10. The level measurement apparatus as claimed in claim 9, wherein said reference voltage is greater than said sensed voltage so that the output form said operational amplifier comprises a positive voltage.

11. The level measurement apparatus as claimed in claim 10, wherein said protection circuit includes a voltage reference source for providing said reference voltage, and said voltage reference source comprises a temperature compensated voltage source.

12. The level measurement apparatus as claimed in claim 10, wherein said leakage current detector circuit includes a bipolar junction transistor having an emitter terminal, a collector terminal and a base terminal coupled to said Zener diodes for receiving said leakage currents and said component for generating said sensed voltage comprising a resistor coupled between the base and emitter terminals of said bipolar junction transistor.

13. The level measurement apparatus as claimed in claim 12, wherein said protection circuit includes a voltage reference source for providing said reference voltage, and said voltage reference source comprising a diode connected bipolar junction transistor having similar characteristics to said bipolar junction transistor for said leakage current detector circuit.

14. The level measurement apparatus as claimed in claim 13, wherein said protection circuit includes a field effect transistor having a source, a drain and a gate, said source being coupled to one branch of the two wire loop, said drain being coupled to the cathodes of said Zener diodes, and said gate being coupled to the collector of said bipolar junction transistor, said field effect transistor being responsive to the leakage currents flowing in said Zener diodes for controlling the voltage applied to the cathodes of said Zener diodes.

15. A level measurement apparatus, said level measurement apparatus being powered by a two wire loop, said level measurement apparatus comprising:
   means for emitting energy pulses and detecting reflected energy pulses;
   means for controlling a transducer, and means for determining a level measurement based on the time of flight of said reflected energy pulse;
   means for protecting coupled to the two wire loop at an input terminal and at a return terminal, said means for protecting including one or more Zener diodes, means for detecting leakage current and means for generating a compensating current, said means for detecting leakage current being coupled to said Zener diodes and including means for generating a sensed voltage in response to leakage currents from said Zener diodes, means for generating a reference voltage, and said means for generating a compensating current having an input for receiving said sensed voltage and another input for receiving said reference voltage, said means for generating a compensating current including a component for generating a compensating current based on said sensed voltage and said reference voltage, and said compensating current and said leakage currents forming a constant current for the two wire loop.

16. The level measurement apparatus as claimed in claim 15, wherein said means for generating a compensating current comprises an operational amplifier configured as a differencing amplifier.

17. The level measurement apparatus as claimed in claim 16, wherein said means for generating a reference voltage comprises a temperature compensated voltage source.

18. The level measurement apparatus as claimed in claim 17, wherein said reference voltage is set at a level greater than said sensed voltage.

19. The level measurement apparatus as claimed in claim 18, wherein said operational amplifier has a positive supply voltage input coupled to one leg of the current loop and a negative supply voltage input coupled to another leg of the current loop.

* * * * *